(12) United States Patent
Park et al.

(10) Patent No.: US 10,444,374 B2
(45) Date of Patent: Oct. 15, 2019

(54) GNSS RECEIVER AND MOBILE SYSTEM INCLUDING THE SAME

(71) Applicant: Samsung Electronics Co., Ltd., Suwon-si (KR)

(72) Inventors: Jung-Jun Park, Seoul (KR); Woo-Jin Lee, Suwon-si (KR); Jae-Bum Cho, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 372 days.

(21) Appl. No.: 15/293,796

(22) Filed: Oct. 14, 2016

(65) Prior Publication Data

US 2017/0115401 A1   Apr. 27, 2017

(30) Foreign Application Priority Data

Oct. 21, 2015   (KR) ........................ 10-2015-0146390

(51) Int. Cl.
*G01S 19/34* (2010.01)
*H04B 7/185* (2006.01)

(52) U.S. Cl.
CPC .......... *G01S 19/34* (2013.01); *H04B 7/18515* (2013.01); *H04B 7/18519* (2013.01);
(Continued)

(58) Field of Classification Search
CPC . G01S 19/34; H04B 7/18515; H04B 7/18519; Y02D 70/168; Y02D 70/26;
(Continued)

(56) References Cited

U.S. PATENT DOCUMENTS 7,847,726 B2   12/2010   Jia et al.
8,134,502 B2   3/2012    Lennen
(Continued)

FOREIGN PATENT DOCUMENTS

JP   11202041     7/1999
JP   2008051808   3/2008
(Continued)

OTHER PUBLICATIONS

"Power down", Idioms by the Free Dictionary, downloaded Apr. 16, 2019 (Year: 2019).*

*Primary Examiner* — Frank J McGue
(74) *Attorney, Agent, or Firm* — Onello & Mello, LLP

(57) ABSTRACT

A GNSS receiver includes a RF unit, a baseband processing unit, a storage unit, a mode control unit and a counter unit. The RF unit receives a satellite signal from an external satellite. The baseband processing unit determines present operation environment of the GNSS receiver based on the satellite signal. The storage unit stores information received by the RF unit and information generated by the baseband processing unit. The mode control unit controls an operation mode of the GNSS receiver based on the present operation environment. The operation mode includes a normal mode and a low power mode. The counter unit counts a first number representing a number of consecutive times in which the GNSS receiver has entered the low power mode. When the GNSS receiver enters the low power mode, the mode control unit turns off at least one of the RF unit, the baseband processing unit and the storage unit based on the first number.

20 Claims, 13 Drawing Sheets

(52) U.S. Cl.
CPC .......... *Y02D 70/00* (2018.01); *Y02D 70/1224* (2018.01); *Y02D 70/1262* (2018.01); *Y02D 70/164* (2018.01); *Y02D 70/166* (2018.01); *Y02D 70/168* (2018.01); *Y02D 70/26* (2018.01); *Y02D 70/446* (2018.01)

(58) Field of Classification Search
CPC .... Y02D 7/1224; Y02D 70/446; Y02D 70/00; Y02D 70/1262; Y02D 70/164; Y02D 70/166
USPC .................................................. 342/357.74
See application file for complete search history.

(56) References Cited

U.S. PATENT DOCUMENTS

| | | |
|---|---|---|
| 8,432,771 B2 | 4/2013 | Matsuzaki |
| 8,531,333 B2 | 9/2013 | Leclercq et al. |
| 8,570,219 B2 | 10/2013 | Tachigi |
| 9,019,158 B2 | 4/2015 | Tsai et al. |
| 2012/0223860 A1 | 9/2012 | Leclercq |
| 2015/0163749 A1 | 6/2015 | Chawla |
| 2017/0316677 A1* | 11/2017 | Messier ............. G08B 21/0277 |

FOREIGN PATENT DOCUMENTS

| | | |
|---|---|---|
| JP | 2008196896 | 8/2008 |
| JP | 2011223548 | 11/2011 |
| JP | 2015121437 | 7/2015 |
| KR | 101334507 | 11/2013 |
| KR | 101479770 | 1/2015 |

\* cited by examiner

GNSS RECEIVER AND MOBILE SYSTEM INCLUDING THE SAME

CROSS-REFERENCE TO RELATED APPLICATION

This application claims priority under 35 USC § 119 to Korean Patent Application No. 10-2015-0146390, filed on Oct. 21, 2015 in the Korean Intellectual Property Office (KIPO), the contents of which are herein incorporated by reference in their entirety.

BACKGROUND

1. Technical Field

Example embodiments relate generally to power management, and more particularly to global navigation satellite system (GNSS) receivers with relatively low power consumption and mobile systems including the GNSS receivers.

2. Description of the Related Art

A global navigation satellite system (GNSS) includes constellations of earth-orbiting satellites that constantly transmit orbit information and ranging signals. The orbit information and ranging signals transmitted by the GNSS satellites are received by GNSS receivers.

Recently, a mobile system or a portable device has evolved to complex systems including various functions. For example, a GNSS may be employed in conjunction with a mobile system, and then the mobile system may include the GNSS receiver. As diverse capabilities and functionality (for example, the GNSS) converge in a mobile device that is battery-powered, it would be advantageous to reduce power consumption of a mobile device including a GNSS receiver.

SUMMARY

At least one example embodiment of the inventive concepts provides a global navigation satellite system (GNSS) receiver capable of efficiently reducing power consumption.

At least one example embodiment of the inventive concepts provides a mobile system including the GNSS receiver.

In example embodiments in accordance with principles of inventive concepts, a GNSS receiver includes a radio frequency (RF) unit, a baseband processing unit, a storage unit, a mode control unit and a counter unit. The RF unit receives a satellite signal from an external satellite. The baseband processing unit determines present operation environment of the GNSS receiver based on the satellite signal. The storage unit stores information received by the RF unit and information generated by the baseband processing unit. The mode control unit controls an operation mode of the GNSS receiver based on the present operation environment. The operation mode includes a normal mode and a low power mode. The counter unit counts a first number representing a number of consecutive times in which the GNSS receiver has entered the low power mode. When the GNSS receiver enters the low power mode, the mode control unit turns off at least one of the RF unit, the baseband processing unit and the storage unit based on the first number.

In example embodiments in accordance with principles of inventive concepts, when the GNSS receiver enters the low power mode, and when the first number is smaller than a first reference number, the RF unit may be turned off.

In example embodiments in accordance with principles of inventive concepts, when the GNSS receiver enters the low power mode, when the first number is equal to or greater than the first reference number, and when the first number is smaller than a second reference number, the RF unit and the storage unit may be turned off.

In example embodiments in accordance with principles of inventive concepts, when the GNSS receiver enters the low power mode, and when the first number is equal to or greater than the second reference number, all of the RF unit, the storage unit and the baseband processing unit may be turned off.

In example embodiments in accordance with principles of inventive concepts, when the GNSS receiver enters the low power mode, the mode control unit may further control a duration of the low power mode based on the first number.

In example embodiments in accordance with principles of inventive concepts, the duration of the low power mode may increase as the first number increases.

In example embodiments in accordance with principles of inventive concepts, the GNSS receiver may further include a power supply unit, a first switch, a second switch and a third switch. The first switch may be connected between the power supply unit and the RF unit. The second switch may be connected between the power supply unit and the storage unit. The third switch may be connected between the power supply unit and the baseband processing unit.

In example embodiments in accordance with principles of inventive concepts, the mode control unit may generate a first control signal for controlling the first switch, a second control signal for controlling the second switch, and a third control signal for controlling the third switch.

In example embodiments in accordance with principles of inventive concepts, the present operation environment may include a number of observable satellites and an intensity of the satellite signal.

In example embodiments in accordance with principles of inventive concepts, when the number of observable satellites is smaller than a reference number, or when the intensity of the satellite signal is less than a reference intensity, the GNSS receiver may operate in the low power mode.

In example embodiments in accordance with principles of inventive concepts, at least one of the reference number and the reference intensity may be variable.

In example embodiments in accordance with principles of inventive concepts, the GNSS receiver may further include a navigation processing unit. The navigation processing unit may perform an initial position acquisition and a position tracking based on the present operation environment.

In example embodiments in accordance with principles of inventive concepts, a mobile system includes a processor and a GNSS receiver controlled by the processor. The GNSS receiver includes a radio frequency (RF) unit, a baseband processing unit and a storage unit. The RF unit receives a satellite signal from an external satellite. The baseband processing unit determines present operation environment of the GNSS receiver based on the satellite signal. The storage unit stores information received by the RF unit and information generated by the baseband processing unit. The GNSS receiver operates in one of a normal mode and a low power mode based on the present operation environment. When the GNSS receiver enters the low power mode, at least one of the RF unit, the baseband processing unit and the storage unit is turned off based on a first number representing a number of consecutive times in which the GNSS receiver has entered the low power mode.

In example embodiments in accordance with principles of inventive concepts, the GNSS receiver may further include a mode control unit and a counter unit. The mode control unit may select one of the normal mode and the low power mode based on the present operation environment, and may turn off at least one of the RF unit, the baseband processing unit and the storage unit based on the first number when the GNSS receiver enters the low power mode. The counter unit may count the first number.

In example embodiments in accordance with principles of inventive concepts, the processor may include a mode control unit and a counter unit. The mode control unit may select one of the normal mode and the low power mode based on the present operation environment, and may turn off at least one of the RF unit, the baseband processing unit and the storage unit based on the first number when the GNSS receiver enters the low power mode. The counter unit may count the first number.

In example embodiments in accordance with principles of inventive concepts a GNSS receiver according to example embodiments may selectively operate in the low power mode based on the present operation environment. When the GNSS receiver enters the low power mode, elements (for example, the RF unit, the baseband processing unit and the storage unit) in the GNSS receiver may be selectively and/or sequentially turned off based on the number of consecutive times in which the GNSS receiver has entered the low power mode. In addition, the GNSS receiver may further control the duration of the low power mode based on the number of consecutive times in which the GNSS receiver has entered the low power mode. Accordingly, power consumption of the GNSS receiver and the mobile system including the GNSS receiver may be efficiently reduced.

In example embodiments in accordance with principles of inventive concepts, a portable electronic device includes a satellite navigation receiver, the satellite navigation receiver including, an RF unit; a baseband unit; and a storage unit, wherein the receiver is configured to supply power to or withhold power from the RF, baseband, and storage units, depending upon whether acceptable signals are available from a sufficient number of navigation satellites.

In example embodiments in accordance with principles of inventive concepts, a portable electronic device includes a processor configured to determine whether acceptable signals are available from a sufficient number of navigation satellites and to initially withhold power from one of the RF, baseband, or storage units if acceptable signals are not available from a sufficient number of navigation satellites.

In example embodiments in accordance with principles of inventive concepts, a portable electronic device include a processor configured to withhold power from two of the RF, baseband, or storage units if acceptable signals are not available from a sufficient number of navigation satellites for at least a first threshold period of time.

In example embodiments in accordance with principles of inventive concepts, a portable electronic device includes a processor configured to withhold power from all three of the RF, baseband, and storage units if acceptable signals are not available from a sufficient number of navigation satellites for at least a second threshold period of time greater than the first threshold period of time.

In example embodiments in accordance with principles of inventive concepts, a portable electronic device includes a satellite navigation receiver that is a global navigation satellite system receiver.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
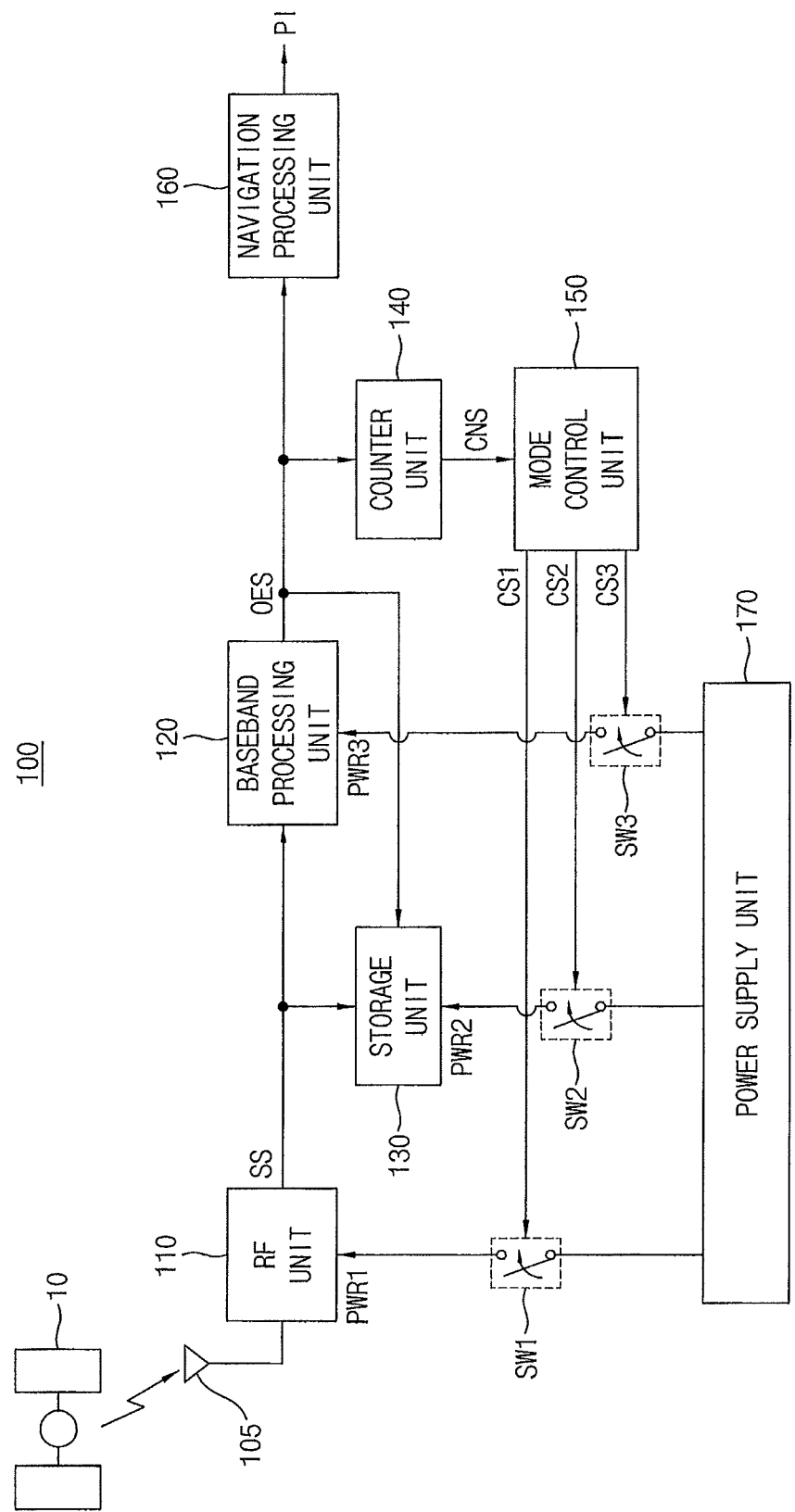
FIG. 1 is a block diagram illustrating a global navigation satellite system (GNSS) receiver according to example embodiments.

Various example embodiments will be described more fully with reference to the accompanying drawings, in which example embodiments are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (for example, "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which the inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with principles of inventive concepts, in a satellite navigation system, such as a global navigation satellite system (GNSS—Global Positioning System (GPS) and GLONASS are examples of global navigation satellite systems) a receiver may operate to conserve power consumption, particularly if the receiver is a mobile or battery-operated device. A receiver in accordance with principles of inventive concepts may determine its current operating environment and supply power to or withhold power from one or more components, depending upon the current operating environment. The current operating environment may be determined by a processor based upon the number and strength of signals available from GNSS satellites at a given time, for example. If acceptable signals (that is signals having sufficient power, signal-to-noise ratio, etc.) are available from at least a threshold number of satellites, the receiver, or, more particularly, a processor allows power to be supplied to all components of the receiver. On the other hand, if fewer than a threshold number of acceptable satellite signals are available, the processor may determine that the current operating environment does not warrant the supply of power to one or more component blocks, such as an RF unit, a baseband unit, or a storage unit, for example.

In example embodiments, the degree of power conservation, that is, the number of units from which power may be withheld, may be determined by the length of time satellite reception has been unavailable. For example, a receiver in accordance with principles of inventive concepts may withhold power from one unit, such as an RF unit, if satellite reception has been unavailable for less than a first threshold period of time. If satellite reception continues to be unavailable, a receiver may withhold power from an additional unit, such as a storage unit, if satellite reception has been unavailable for more than a first but less than a second threshold period of time. And, if satellite reception continues to be unavailable for a period of time that meets or exceeds the second period of time, power may be withheld from an additional unit, such as a baseband processing unit.

In example embodiments, the present operating environment of a receiver may be determined according to other factors, such as whether the receiver is in a data collection state, dilution of precision (DOP), estimated position error, for example, and, in accordance with principles of inventive concepts, the processor may adjust power supplied to component blocks accordingly.

FIG. 1 is a block diagram illustrating a global navigation satellite system (GNSS) receiver according to example embodiments.

Referring to FIG. 1, a GNSS receiver 100 includes a radio frequency (RF) unit 110, a baseband processing unit 120, a storage unit 130, a counter unit 140 and a mode control unit 150. The GNSS receiver 100 may further include an antenna 105, a navigation processing unit 160, a power supply unit 170, a first switch SW1, a second switch SW2 and a third switch SW3.

In operation, RF unit 110 receives a satellite signal SS. The satellite signal SS may be provided from an external device (for example, an external satellite 10), may be received by the RF unit 110 through the antenna 105, and may be applied to the baseband processing unit 120. For example, the RF unit 110 may perform at least one of various signal processings, such as filtering, amplifying, down-converting, sampling, digitizing, etc., on the satellite signal SS.

The GNSS may include the satellite 10 and the receiver 100. For example, the satellite 10 may be an earth orbiting satellite. Although FIG. 1 illustrates an example where the GNSS receiver 100 receives one satellite signal SS from one satellite 10, the GNSS receiver 100 according to example embodiments may receive a plurality of satellite signals from a plurality of satellites.

The baseband processing unit 120 determines present operation environment (or current operation environment) of the GNSS receiver 100 based on the satellite signal SS. The baseband processing unit 120 may generate an operation environment signal OES corresponding to the present operation environment of the GNSS receiver 100. It may be determined based on the present operation environment of the GNSS receiver 100 whether a reception of the satellite signal SS is possible or not (for example, whether the GNSS is available or unavailable).

In some example embodiments, as will be described with reference to FIG. 4, the present operation environment of the GNSS receiver 100 may include the number of observable satellites and corresponding intensity of the satellite signal SS that are obtained at a present position of the GNSS receiver 100 from observable the satellites. Alternatively, the present operation environment of the GNSS receiver 100 may include a data collection state, dilution of precision (DOP), an estimated position error (EPE), etc. that are obtained at the present position.

The storage unit 130 stores information received by the RF unit 110 and information generated by the baseband processing unit 120. The information received by the RF unit 110 may be information corresponding to (for example, included in) the satellite signal SS. The information generated by the baseband processing unit 120 may be information corresponding to the present operation environment of the GNSS receiver 100.

In some example embodiments, the storage unit 130 may include at least one volatile memory such as a dynamic random access memory (DRAM), a static random access memory (SRAM), etc. The storage unit 130 may also, or in the alternative, include at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc.

The mode control unit 150 controls an operation mode of the GNSS receiver 100 based on the present operation environment of the GNSS receiver 100. The operation modes of the GNSS receiver 100 may include a normal mode and a low power mode. That is, the mode control unit 150 may select one of the normal mode and the low power mode based on the present operation environment of the GNSS receiver 100, and the GNSS receiver 100 may operate in one of the normal mode and the low power mode based on control by the mode control unit 150.

In example embodiments in accordance with principles of inventive concepts, the normal mode may represent an operation mode where the GNSS receiver 100 performs normal operations such as an initial position acquisition, a position tracking, etc., and the low power mode may represent an operation mode for reducing power consumption of the GNSS receiver 100. The low power mode may be referred to as a hibernation mode. In the low power mode, operation of at least a part of the GNSS receiver 100 may be stopped, terminated, or reduced and/or power supplied to at least a part of the GNSS receiver 100 may be blocked, shut off, or reduced. In other words, at least a part of the GNSS receiver 100 may be turned off, shut down, or reduced in voltage level of operation frequency, for example, in the low power mode.

The counter unit 140 counts a first number. The first number represents the number of consecutive times in which the GNSS receiver 100 has entered the low power mode. The counter unit 140 may generate a count signal CNS corresponding to the first number.

When the GNSS receiver 100 enters the low power mode, the mode control unit 150 turns off at least one of the RF unit 110, the baseband processing unit 120 and the storage unit 130, based on the first number. For example, the mode control unit 150 may generate a first control signal CS1, a second control signal CS2 and a third control signal CS3 based on the count signal CNS. The RF unit 110 may be selectively turned off based on the first control signal CS1, the storage unit 130 may be selectively turned off based on the second control signal CS2, and the baseband processing unit 120 may be selectively turned off based on the third control signal CS3, for example.

In some example embodiments, when the GNSS receiver 100 enters the low power mode, the mode control unit 150 may additionally control the duration of the low power mode based on the first number.

Operations of the GNSS receiver 100 based on the control of the mode control unit 150 will be explained in detail.

The power supply unit 170 may supply power (for example, power supply voltages) to the RF unit 110, the baseband processing unit 120 and the storage unit 130. Although not illustrated in FIG. 1, the power supply unit 170 may additionally supply power to the counter unit 140, the mode control unit 150 and the navigation processing unit 160.

The first switch SW1 may be connected between the power supply unit 170 and the RF unit 110, and may selectively supply a first power supply voltage PWR1 to the RF unit 110, based on the first control signal CS1. The second switch SW2 may be connected between the power supply unit 170 and the storage unit 130, and may selectively supply a second power supply voltage PWR2 to the storage unit 130, based on the second control signal CS2. The third switch SW3 may be connected between the power supply unit 170 and the baseband processing unit 120, and may selectively supply a third power supply voltage PWR3 to the baseband processing unit 120, based on the third control signal CS3.

The navigation processing unit 160 may perform the initial position acquisition and the position tracking based on the present operation environment of the GNSS receiver 100. The initial position acquisition and the position tracking may be performed in the normal mode. The navigation processing unit 160 may generate position information PI that is a result of the initial position acquisition and the position tracking. The position information PI may correspond to a position and/or a moving path (or route) of the GNSS receiver 100.

Although not illustrated in FIG. 1, at least one of the counter unit 140, the mode control unit 150 and the power supply unit 170 may be located outside the GNSS receiver 100.

The GNSS receiver 100 according to example embodiments may selectively operate in the low power mode based on the present operation environment. When the GNSS receiver 100 enters the low power mode, at least one of the RF unit 110, the baseband processing unit 120 and the storage unit 130 may be turned off, based on the number of consecutive times in which the GNSS receiver 100 has entered the low power mode. In addition, the GNSS receiver 100 may additionally control the duration of the low power mode, based on the number of consecutive times in which the GNSS receiver 100 has entered the low power mode. Accordingly, power consumption of the GNSS receiver 100 may be efficiently reduced.

Figure 2:
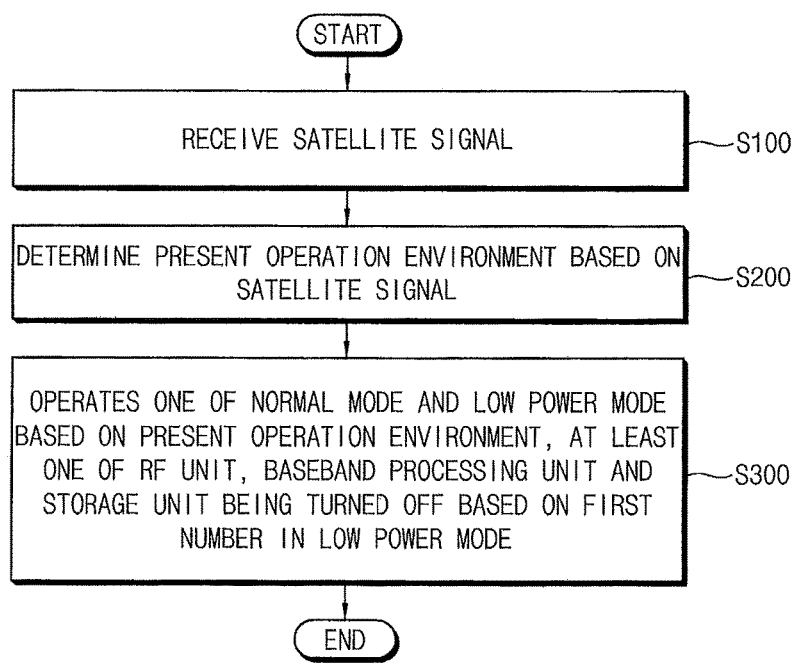
FIG. 2 is a flow chart illustrating a method of operating the GNSS receiver according to example embodiments.

FIG. 2 is a flow chart illustrating a method of operating the GNSS receiver according to example embodiments in accordance with principles of inventive concepts.

Referring to FIGS. 1 and 2, in a method of operating the GNSS receiver 100 according to example embodiments, after the GNSS receiver 100 is turned on or powered on, the satellite signal SS is received (step S100), and the present operation environment of the GNSS receiver 100 is determined based on the satellite signal SS (step S200). For example, the RF unit 110 may receive the satellite signal SS from the satellite 10 that is an earth orbiting satellite. The baseband processing unit 120 may determine, based on the present operation environment, whether the reception of the satellite signal SS is possible.

By the control of the mode control unit 150, the GNSS receiver 100 operates in one of the normal mode and the low power mode based on the present operation environment, and when the GNSS receiver 100 enters the low power mode, at least one of the RF unit 110, the baseband processing unit 120 and the storage unit 130 is turned off based on the first number (for example, the number of consecutive times in which the GNSS receiver 100 has entered the low power mode) (step S300).

For example, when it is determined that the reception of the satellite signal SS is possible (for example, when the GNSS receiver 100 is located inside a coverage area), the GNSS receiver 100 may operate in the normal mode based on the control of the mode control unit 150. When it is determined that the reception of the satellite signal SS is not possible (for example, when the GNSS receiver 100 is located outside the coverage area), the GNSS receiver 100 may operate in the low power mode based on the control of the mode control unit 150. The counter unit 140 may count the first number. The mode control unit 150 may generate the first, second and third control signals CS1, CS2 and CS3 for controlling turned-off or powered-off of the RF unit 110, the baseband processing unit 120 and the storage unit 130 based on the first number.

In some example embodiments, when the GNSS receiver 100 enters the low power mode, the duration of the low power mode may be additionally controlled based on the first number.

Figure 3:
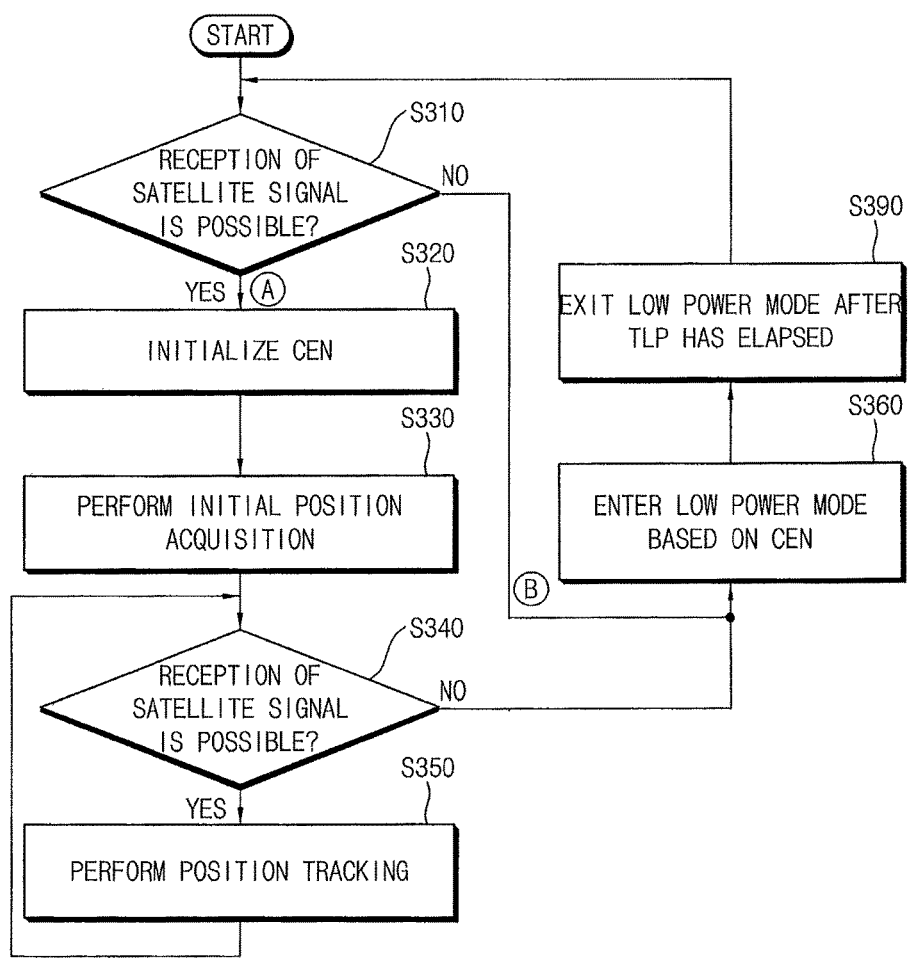
FIG. 3 is a flow chart illustrating an example of step S300 in FIG. 2.

FIG. 3 is a flow chart illustrating an example of step S300 of FIG. 2. FIG. 4 is a flow chart illustrating an example of step S310 of FIG. 3.

Figure 4:
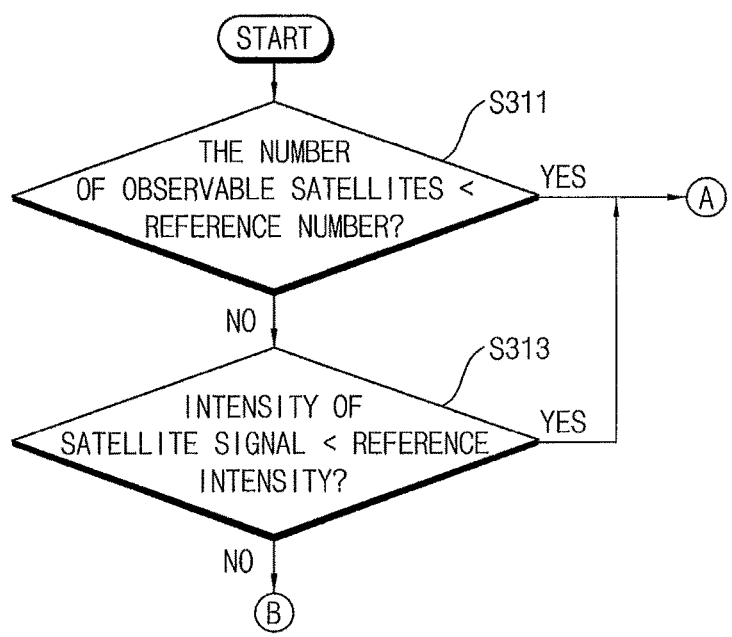
FIG. 4 is a flow chart illustrating an example of step S310 in FIG. 3.

Referring to FIGS. 1, 2, 3 and 4, in the step S300, it may be determined, based on the present operation environment, whether the reception of the satellite signal SS is possible or not (step S310). For example, as illustrated in FIG. 4, the present operation environment of the GNSS receiver 100 may include the number of observable satellites and the intensity of the satellite signal SS that are obtained at the present position of the GNSS receiver 100.

When the reception of the satellite signal SS is possible (step S310: YES), for example, when the number of observable satellites is equal to or greater than a reference number (step S311: NO) and when the intensity of the satellite signal SS is equal to or more than a reference intensity (step S313: NO), the GNSS receiver 100 may operate in the normal mode. In the normal mode, the first number CEN may be initialized (step S320), and the initial position acquisition may be performed (step S330). For example, the counter unit 140 may initialize the first number CEN to zero, and the navigation processing unit 160 may perform the initial position acquisition to detect an initial position of the GNSS receiver 100.

In example embodiments, the intensity of the satellite signal SS may be obtained based on carrier-to-noise ratios (CNRs) that are measured with respect to the plurality of satellites.

In some example embodiments, the reference number may be in a range of from about 2 to 5. For example, the reference number may be about 3 or 4.

In some example embodiments, when the intensity of the satellite signal SS is obtained based on the CNRs, the intensity of the satellite signal SS may be in a range of from about 5~20 dB-Hz. For example, the intensity of the satellite signal SS may be about 10~15 dB-Hz.

In example embodiments, at least one of the reference number and the reference intensity may be variable. For example, at least one of the reference number and the reference intensity may increase or decrease depending on elapsed time after the GNSS receiver 100 is turned on or powered on.

After an initial position acquisition is performed, it may be re-determined, based on the present operation environment, whether the reception of the satellite signal SS is possible or not (step S340). The step S340 may be substantially the same as the step S310. In addition, the present operation environment may be re-determined for the step S340.

When the reception of the satellite signal SS is still possible (step S340: YES), for example, when the number of observable satellites is still equal to or greater than the reference number and when the intensity of the satellite signal SS is still equal to or greater than the reference intensity, the GNSS receiver 100 may still operate in the normal mode, and the position tracking may be performed (step S350). For example, the navigation processing unit 160 may perform the position tracking to detect the moving path (or route) of the GNSS receiver 100. The steps S340 and S350 may be periodically repeated while the state of the GNSS receiver 100 where the reception of the satellite signal SS is possible is continuously maintained.

When the reception of the satellite signal SS is not possible (step S310: NO or step S340: NO), for example, when the number of observable satellites is smaller than the reference number (step S311: YES) or when the intensity of the satellite signal SS is less than the reference intensity (step S313: YES), the GNSS receiver 100 may enter the low power mode based on the first number CEN (step S360), may operate in the low power mode, and may exit the low power mode after the duration TLP of the low power mode has elapsed (step S390). After the GNSS receiver 100 exits the low power mode, at least one of the steps S310, S320, S330, S340, S350, S360 and S390 may be repeated.

The GNSS receiver 100 according to example embodiments may enter the low power mode both before the initial position acquisition and before the position tracking.

Figure 5:
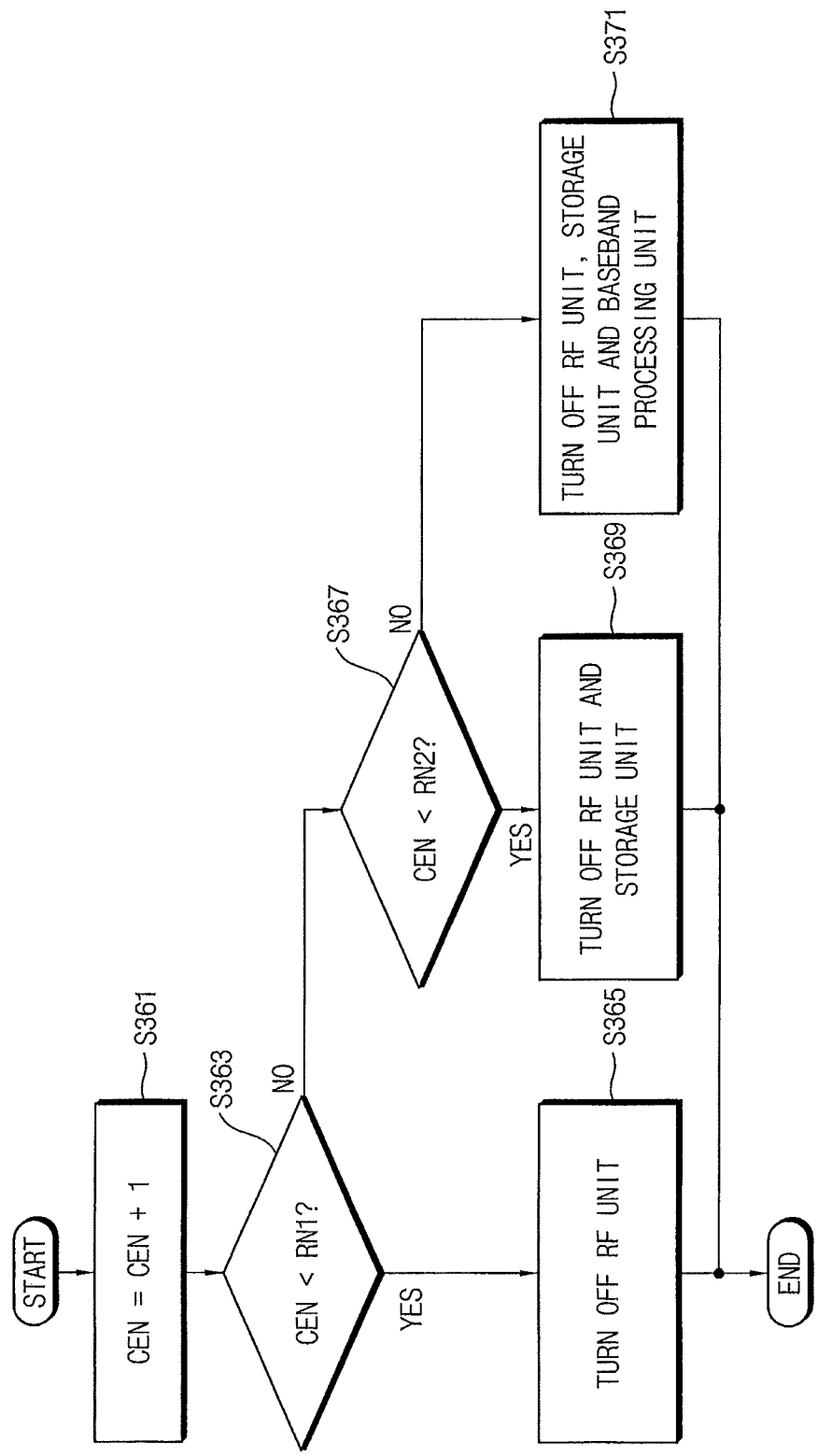
FIG. 5 is a flow chart illustrating an example of step S360 in FIG. 3.

FIG. 5 is a flow chart illustrating an example of step S360 in FIG. 3.

Referring to FIGS. 1, 3 and 5, in the step S360, the first number CEN may increase (step S361). For example, the counter unit 140 may increase the first number CEN by about 1.

The first number CEN may be compared with at least one of a first reference number RN1 and a second reference number RN2 (steps S363 and S367). At least one of the RF unit 110, the baseband processing unit 120 and the storage unit 130 may be turned off based on a result of the comparison (steps S365, S369 and S371).

When the GNSS receiver 100 enters the low power mode, and when the first number CEN is smaller than the first reference number RN1 (step S363: YES), the RF unit 110 may be turned off (step S365). For example, in the step S365, the mode control unit 150 may activate the first control signal CS1, and then the RF unit 110 may be turned off. An operation mode where only the RF unit 110 is turned off may be referred to herein as a first low power mode.

When the GNSS receiver 100 enters the low power mode, when the first number CEN is equal to or greater than the first reference number RN1 (step S363: NO), and when the first number CEN is smaller than the second reference number RN2 (step S367: YES), the RF unit 110 and the storage unit 130 may be turned off (step S369). The second reference number RN2 may be greater than the first reference number RN1. For example, in the step S369, the mode control unit 150 may activate the first and second control signals CS1 and CS2, and then the RF unit 110 and the storage unit 130 may be turned off. An operation mode where the RF unit 110 and the storage unit 130 are turned off may be referred to herein as a second low power mode.

When the GNSS receiver 100 enters the low power mode, and when the first number CEN is equal to or greater than the first reference number RN1 and the second reference number RN2 (step S363: NO and step S367: NO), the RF unit 110, the storage unit 130 and the baseband processing unit 120 may be turned off (step S371). For example, in the step S369, the mode control unit 150 may activate the first, second and third control signals CS1, CS2 and CS3, and then the RF unit 110, the storage unit 130 and the baseband processing unit 120 may be turned off. An operation mode where all of the RF unit 110, the storage unit 130 and the baseband processing unit 120 are turned off may be referred to herein as a third low power mode.

Although not illustrated in FIGS. 3 and 5, in the step S390, the turned-off element in the GNSS receiver 100 may be turned on. For example, when the GNSS receiver 100 exits the low power mode after the step S365, the RF unit 110 may be turned on. When the GNSS receiver 100 exits the low power mode after the step S369, the RF unit 110 and the storage unit 130 may be turned on. When the GNSS receiver 100 exits the low power mode after the step S371, the RF unit 110, the storage unit 130 and the baseband processing unit 120 may be turned on.

Figure 6:
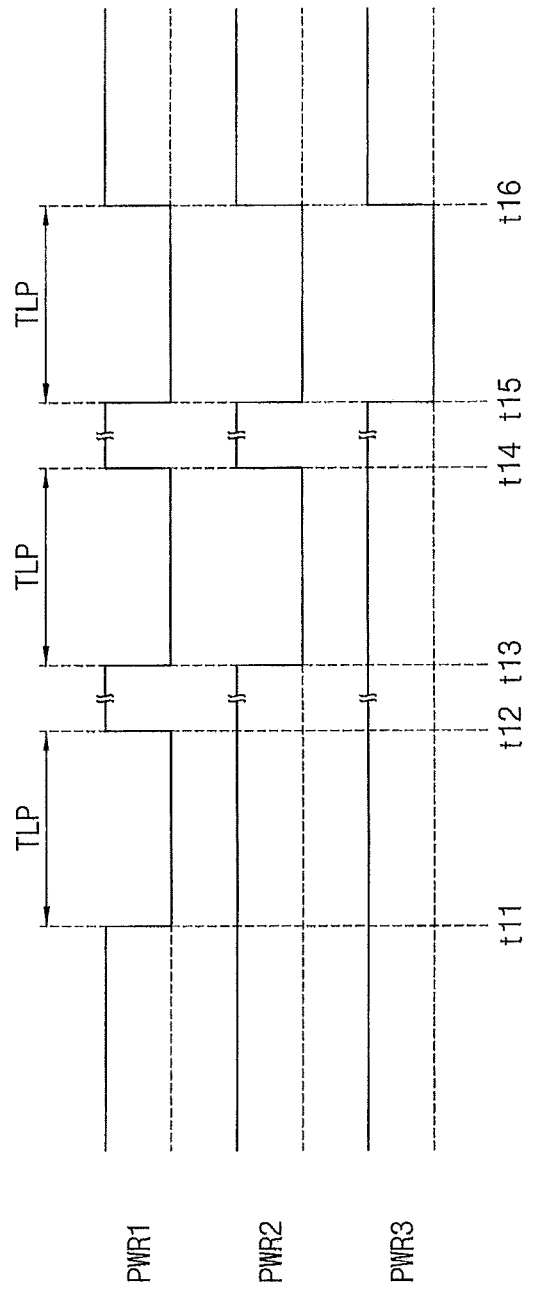
FIG. 6 is a timing diagram for describing an operation of the GNSS receiver according to example embodiments.

FIG. 6 is a timing diagram for describing operation of an example embodiment of a GNSS receiver in accordance with principles of inventive concepts.

Referring to FIGS. 1, 3, 5 and 6, at time t11, it may be determined that the reception of the satellite signal SS is not possible, it may be determined that the first number CEN is smaller than the first reference number RN1, and then the GNSS receiver 100 may enter the first low power mode. The mode control unit 150 may activate the first control signal CS1, the first switch SW1 may be opened based on the activated first control signal CS1, and, as a result, the first power supply voltage PWR1 may be cut off from the RF unit 110.

At time t12 at which the duration TLP of the low power mode has elapsed from time t11, the GNSS receiver 100 may exit the first low power mode. The mode control unit 150 may deactivate the first control signal CS1, the first switch SW1 may be closed based on the deactivated first control signal CS1, and, as a result, the first power supply voltage PWR1 may be restored/supplied to the RF unit 110.

At time t13 after time t12, it may be determined that the reception of the satellite signal SS is still not possible, it may be determined that the first number CEN is equal to or greater than the first reference number RN1 and is smaller than the second reference number RN2, and the GNSS receiver 100 may then enter the second low power mode. As a result, mode control unit 150 may activate the first and second control signals CS1 and CS2, the first and second switches SW1 and SW2 may be opened based on the activated first and second control signals CS1 and CS2, and the first and second power supply voltages PWR1 and PWR2 may be withdrawn from the RF unit 110 and the storage unit 130.

At time t14 at which the duration TLP of the low power mode has elapsed from time t13, the GNSS receiver 100 may exit the second low power mode. The mode control unit 150 may deactivate the first and second control signals CS1 and CS2, the first and second switches SW1 and SW2 may be closed based on the deactivated first and second control signals CS1 and CS2, and, as a result, the first and second power supply voltages PWR1 and PWR2 may be restored/supplied to the RF unit 110 and the storage unit 130.

At time t15 after time t14, it may be determined that the reception of the satellite signal SS is still not possible, it may be determined that the first number CEN is equal to or greater than the second reference number RN2, and then the GNSS receiver 100 may enter the third low power mode. The mode control unit 150 may activate the first, second and third control signals CS1, CS2 and CS3, the first, second and third switches SW1, SW2 and SW3 may be opened based on the activated first, second and third control signals CS1, CS2 and CS3, and, as a result, the first, second and third power supply voltages PWR1, PWR2 and PWR3 may be withdrawn from the RF unit 110, the storage unit 130 and the baseband processing unit 120.

At time t16 at which the duration TLP of the low power mode has elapsed from time t15, the GNSS receiver 100 may exit the third low power mode. The mode control unit 150 may deactivate the first, second and third control signals CS1, CS2 and CS3, the first, second and third switches SW1, SW2 and SW3 may be closed based on the deactivated first, second and third control signals CS1, CS2 and CS3, and, as a result, the first, second and third power supply voltages PWR1, PWR2 and PWR3 may be supplied to the RF unit 110, the storage unit 130 and the baseband processing unit 120.

Figure 7:
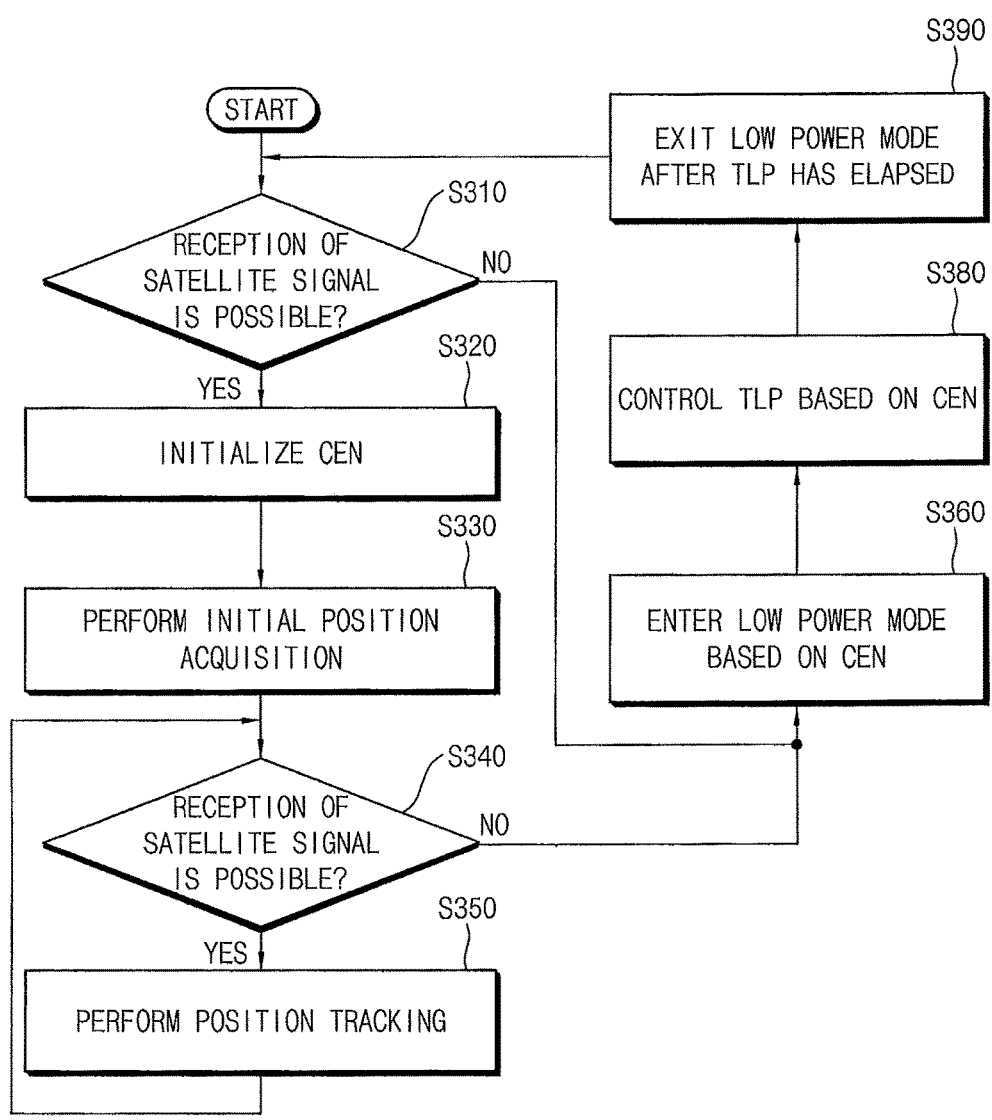
FIG. 7 is a flow chart illustrating another example of step S300 in FIG. 2.

FIG. 7 is a flow chart illustrating another example of step such as step S300 in FIG. 2 in accordance with principles of inventive concepts.

Referring to FIGS. 1, 2 and 7, an example of FIG. 7 may be substantially the same as the example of FIG. 3, except that step S380 is further performed in the example of FIG. 7.

In step S300, it may be determined, based on the present operation environment, whether the reception of the satellite signal SS is possible or not (step S310). When the reception of the satellite signal SS is possible (step S310: YES), the first number CEN may be initialized (step S320), and the initial position acquisition may be performed (step S330). After the initial position acquisition is performed, it may be re-determined based on the present operation environment whether the reception of the satellite signal SS is possible or not (step S340). When the reception of the satellite signal SS is still possible (step S340: YES), the position tracking may be performed (step S350). When the reception of the satellite signal SS is not possible (step S310: NO or step S340: NO), the GNSS receiver 100 may enter the low power mode based on the first number CEN (step S360), and may operate in the low power mode. The duration TLP of the low power mode may be controlled based on the first number CEN (step S380), and the GNSS receiver 100 may exit the low power mode after the duration TLP of the low power mode has elapsed (step S390), for example.

In some example embodiments, in the step S380, the duration TLP of the low power mode may increase as the first number CEN increases.

Figure 8:
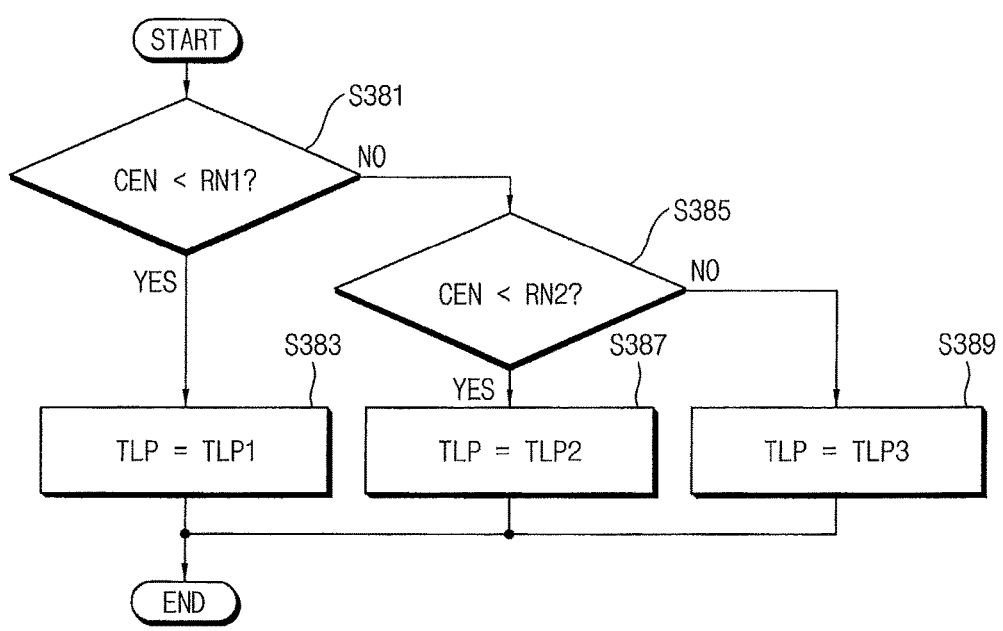
FIG. 8 is a flow chart illustrating an example of step S380 in FIG. 7.

FIG. 8 is a flow chart illustrating an example of step such as step S380 in FIG. 7 in accordance with principles of inventive concepts.

Referring to FIGS. 1, 7 and 8, in the step S380, the first number CEN may be compared with at least one of the first reference number RN1 and the second reference number RN2 (steps S381 and S385), and the duration TLP of the low power mode may be controlled based on a result of the comparison (steps S383, S387 and S389).

When the GNSS receiver 100 enters the low power mode, and when the first number CEN is smaller than the first reference number RN1 (step S381: YES), the duration TLP of the low power mode may be set to a first duration TLP1 (step S383). For example, in the step S383, the mode control unit 150 may set an activation duration of at least one of the control signals CS1, CS2 and CS3 as the first duration TLP1. The activation duration of at least one of the control signals CS1, CS2 and CS3 may correspond to the duration TLP of the low power mode.

When the GNSS receiver 100 enters the low power mode, when the first number CEN is equal to or greater than the first reference number RN1 (step S381: NO), and when the first number CEN is smaller than the second reference number RN2 (step S385: YES), the duration TLP of the low power mode may be set to a second duration TLP2 (step S387). The second duration TLP2 may be longer than the first duration TLP1. For example, in the step S387, the mode control unit 150 may set the activation duration of at least one of the control signals CS1, CS2 and CS3 as the second duration TLP2.

When the GNSS receiver 100 enters the low power mode, and when the first number CEN is equal to or greater than the second reference number RN2 (step S381: NO and step S385: NO), the duration TLP of the low power mode may be set to a third duration TLP3 (step S389). The third duration TLP3 may be longer than the second duration TLP2. For example, in the step S389, the mode control unit 150 may set the activation duration of at least one of the control signals CS1, CS2 and CS3 as the third duration TLP3.

Figure 9:
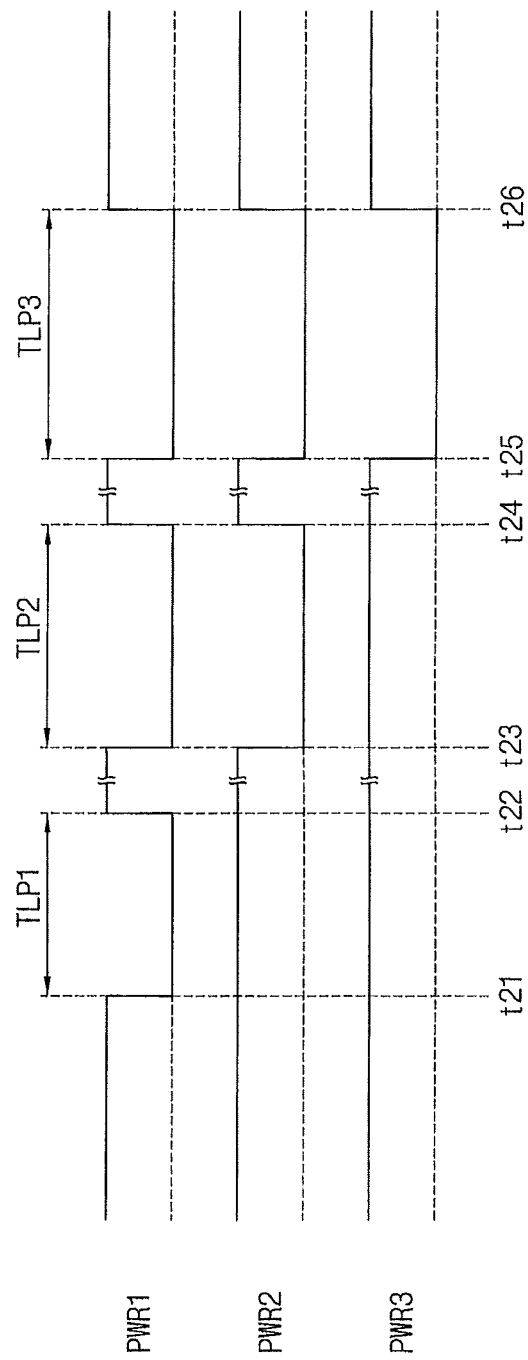
FIG. 9 is a timing diagram for describing an operation of the GNSS receiver according to example embodiments.

FIG. 9 is a timing diagram for describing an operation of an example embodiment of a GNSS receiver in accordance with principles of inventive concepts.

Referring to FIGS. 1, 7, 8 and 9, at time t21, it may be determined that the reception of the satellite signal SS is not possible, and it may be determined that the first number CEN is smaller than the first reference number RN1. The GNSS receiver 100 may enter the first low power mode, and the mode control unit 150 may determine the duration of the low power mode as the first duration TLP1. During the first duration TLP1 (for example, a duration from time t21 to time t22), the first power supply voltage PWR1 may be withdrawn from RF unit 110 based on the first control signal CS1.

At time t23 after time t22, it may be determined that the reception of the satellite signal SS is still not possible, and it may be determined that the first number CEN is equal to or greater than the first reference number RN1 and is smaller than the second reference number RN2. The GNSS receiver 100 may enter the second low power mode, and the mode control unit 150 may determine the duration of the low power mode as the second duration TLP2. During the second duration TLP2 (for example, a duration from time t23 to time t24), the first and second power supply voltages PWR1 and PWR2 may be withdrawn from RF unit 110 and the storage unit 130 based on the first and second control signals CS1 and CS2.

At time t25 after time t24, it may be determined that the reception of the satellite signal SS is still not possible, and it may be determined that the first number CEN is equal to or greater than the second reference number RN2. The GNSS receiver 100 may enter the third low power mode, and the mode control unit 150 may determine the duration of the low power mode as the third duration TLP3. During the third duration TLP3 (for example, a duration from time t25 to time t26), the first, second and third power supply voltages PWR1, PWR2 and PWR3 may be withdrawn from RF unit 110, the storage unit 130 and the baseband processing unit 120 based on the first, second and third control signals CS1, CS2 and CS3.

Figure 10:
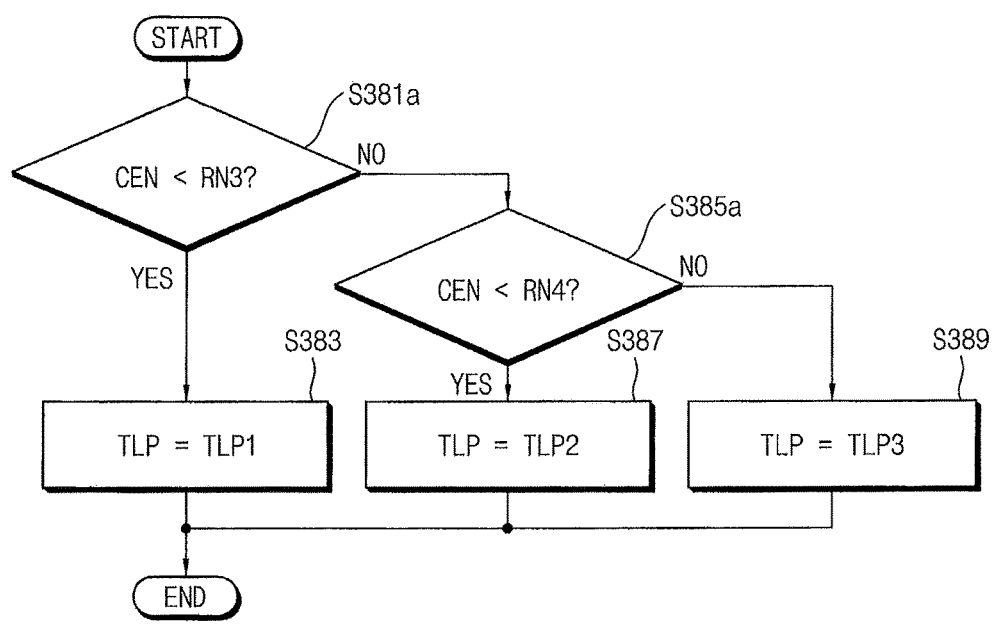
FIG. 10 is a flow chart illustrating another example of step S380 in FIG. 7.

FIG. 10 is a flow chart illustrating another example of step S380 in FIG. 7.

Referring to FIGS. 1, 7 and 10, an example of FIG. 10 may be substantially the same as the example of FIG. 8, except that the steps S381 and S385 in FIG. 8 is replaced with steps S381a and S385a in FIG. 10.

In step S380, the first number CEN may be compared with at least one of a third reference number RN3 and a fourth reference number RN4 (steps S381a and S385a), and the duration TLP of the low power mode may be controlled based on a result of the comparison (steps S383, S387 and S389).

When the GNSS receiver 100 enters the low power mode, and when the first number CEN is smaller than the third reference number RN3 (step S381a: YES), the duration TLP of the low power mode may be set to the first duration TLP1 (step S383). When the GNSS receiver 100 enters the low power mode, when the first number CEN is equal to or greater than the third reference number RN3 (step S381a: NO), and when the first number CEN is smaller than the fourth reference number RN4 (step S385a: YES), the duration TLP of the low power mode may be set to the second duration TLP2 (step S387). When the GNSS receiver 100 enters the low power mode, and when the first number CEN is equal to or greater than the fourth reference number RN4 (step S381a: NO and step S385a: NO), the duration TLP of the low power mode may be set to the third duration TLP3 (step S389).

The fourth reference number RN4 may be greater than the third reference number RN3. In addition, the third reference number RN3 and the fourth reference number RN4 may be different from the first reference number RN1 and the second reference number RN2, respectively. For example, as will be described with reference to FIG. 11, the third reference number RN3 may be smaller than the first reference number RN1. The fourth reference number RN4 may be greater than the first reference number RN1, and may be smaller than the second reference number RN2.

Figure 11:
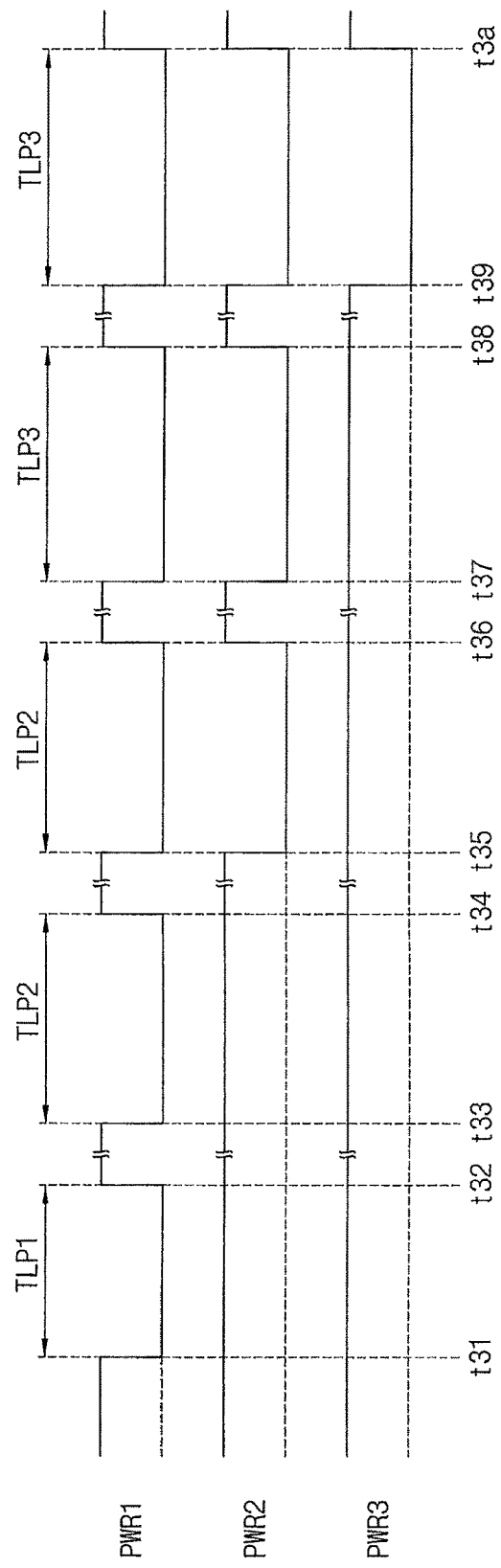
FIG. 11 is a timing diagram for describing an operation of the GNSS receiver according to example embodiments.

FIG. 11 is a timing diagram for describing an operation of an example embodiment of a GNSS receiver in accordance with principles of inventive concepts.

Referring to FIGS. 1, 7, 10 and 11, at time t31, it may be determined that the reception of the satellite signal SS is not possible, it may be determined that the first number CEN is smaller than the first reference number RN1, and it may be determined that the first number CEN is smaller than the third reference number RN3. The GNSS receiver 100 may enter the first low power mode, and the mode control unit 150 may determine the duration of the low power mode as the first duration TLP1. During the first duration TLP1 (for example, a duration from time t31 to time t32), the first power supply voltage PWR1 may be withdrawn from the RF unit 110.

At time t33 after time t32, it may be determined that the reception of the satellite signal SS is still not possible, it may be determined that the first number CEN is smaller than the first reference number RN1, and it may be determined that the first number CEN is equal to or greater than the third reference number RN3 and is smaller than the fourth reference number RN4. The GNSS receiver 100 may enter the first low power mode, and the mode control unit 150 may determine the duration of the low power mode as the second duration TLP2. During the second duration TLP2 (for example, a duration from time t33 to time t34), the first power supply voltage PWR1 may be withdrawn from RF unit 110.

At time t35 after time t34, it may be determined that the reception of the satellite signal SS is still not possible, it may be determined that the first number CEN is equal to or greater than the first reference number RN1 and is smaller than the second reference number RN2, and it may be determined that the first number CEN is equal to or greater than the third reference number RN3 and is smaller than the fourth reference number RN4. The GNSS receiver 100 may enter the second low power mode, and the mode control unit 150 may determine the duration of the low power mode as the second duration TLP2. During the second duration TLP2 (for example, a duration from time t35 to time t36), the first and second power supply voltages PWR1 and PWR2 may be withdrawn from RF unit 110 and storage unit 130.

At time t37 after time t36, it may be determined that the reception of the satellite signal SS is still not possible, it may be determined that the first number CEN is equal to or greater than the first reference number RN1 and is smaller than the second reference number RN2, and it may be determined that the first number CEN is equal to or greater than the fourth reference number RN4. The GNSS receiver 100 may enter the second low power mode, and the mode control unit 150 may determine the duration of the low power mode as the third duration TLP3. During the third duration TLP3 (for example, a duration from time t37 to time t38), the first and second power supply voltages PWR1 and PWR2 may be withdrawn from RF unit 110 and storage unit 130.

At time t39 after time t38, it may be determined that the reception of the satellite signal SS is still not possible, it may be determined that the first number CEN is equal to or greater than the second reference number RN2, and it may be determined that the first number CEN is equal to or greater than the fourth reference number RN4. The GNSS receiver 100 may enter the third low power mode, and the mode control unit 150 may determine the duration of the low power mode as the third duration TLP3. During the third duration TLP3 (for example, a duration from time t37 to time t38), the first, second and third power supply voltages PWR1, PWR2 and PWR3 may be withdrawn from RF unit 110, the storage unit 130 and the baseband processing unit 120.

Although FIG. 11 illustrates an example based on four reference numbers where the third reference number RN3 is smaller than the first reference number RN1 and fourth reference number RN4 is greater than the first reference number RN1 and is smaller than the second reference number RN2, the number and the amount of the reference numbers may be changed in other embodiments in accordance with principles of inventive concepts.

Figure 12:
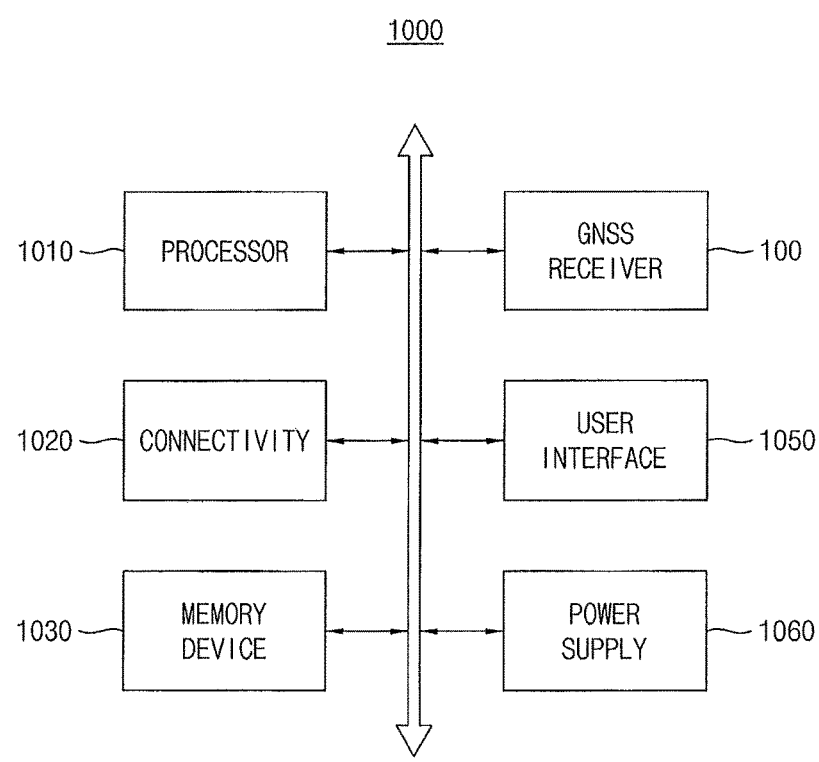
FIGS. 12 and 13 are block diagrams illustrating a mobile system according to example embodiments.
Figure 13:
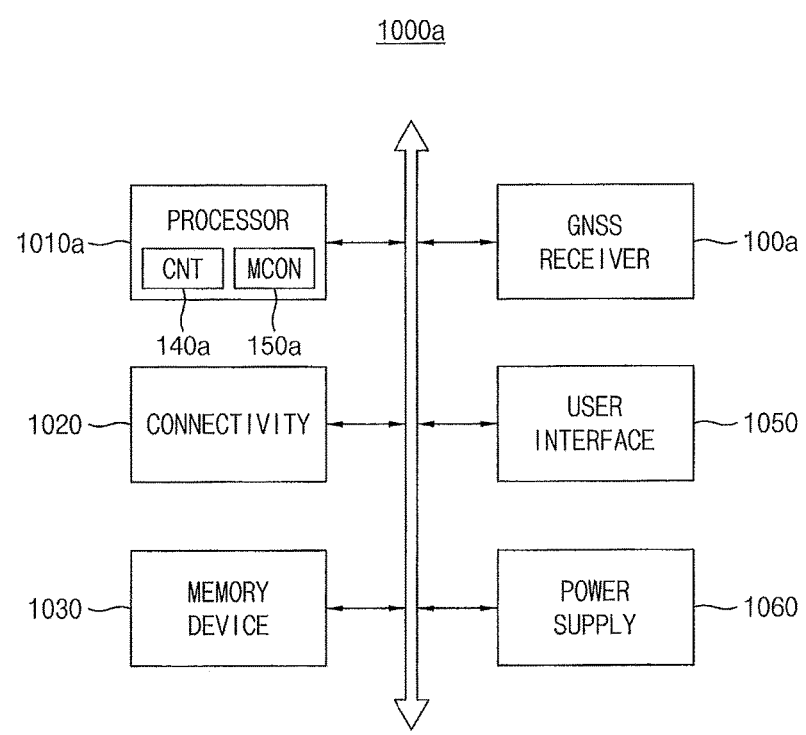

FIGS. 12 and 13 are block diagrams illustrating example embodiments of a mobile system in accordance with principles of inventive concepts.

Referring to FIG. 12, a mobile system 1000 includes a processor 1010 and a GNSS receiver 100. The mobile system 1000 may additionally include a connectivity 1020, a memory device 1030, a user interface 1050 and a power supply 1060. The processor 1010 and the GNSS receiver 100 may be implemented on a semiconductor substrate.

The processor 1010 may perform various computational functions such as particular calculations and tasks. For example, the processor 1010 may be a central processing unit (CPU), a microprocessor, an application processor (AP), etc. The processor 1010 may execute an operating system (OS) to drive the electronic system 1000, and may execute various applications for providing an internet browser, a game, a video, a camera, etc.

In some example embodiments, the processor 1010 may include a single processor core or multiple processor cores. In some example embodiments, the processor 1010 may additionally include a cache memory that is located inside or outside the processor 1010.

The GNSS receiver 100 may be controlled by the processor 1010. The GNSS receiver 100 may be the GNSS receiver 100 of FIG. 1, and may operate according to the examples described with reference to FIGS. 2 through 11. For example, the GNSS receiver 100 may include a RF unit, a baseband processing unit, a storage unit, a counter unit and a mode control unit. The GNSS receiver 100 may selectively operate in the low power mode based on the present operation environment of the GNSS receiver 100. When the GNSS receiver 100 enters the low power mode, elements in the GNSS receiver 100 may be selectively and/or sequentially turned off, and the duration of the low power mode may be further controlled, based on a first number that represents the number of consecutive times in which the GNSS receiver 100 has entered the low power mode. Accordingly, power consumption of the GNSS receiver 100 and the mobile system 1000 including the GNSS receiver 100 may be efficiently reduced.

The connectivity 1020 may communicate with an external device. For example, the connectivity 1020 may communicate according to one of various types of protocols such as universal serial bus (USB), ethernet, near field communication (NFC), radio frequency identification (RFID), a mobile telecommunication like 4-generation (4G) and long term evolution (LTE), a memory card interface. For example, the connectivity 1020 may include a baseband chipset, and may support a communication such as GSM, GPRS, WCDMA, or HSxPA, etc.

The memory device 1030 may operate as a data storage for data processed by the processor 1010 or a working memory. For example, the memory device 1030 may store a boot image for booting the mobile system 1000, a file system for the operating system to drive the mobile system 1000, a device driver for an external device connected to the mobile system 1000, and/or an application executed on the mobile system 1000. For example, the memory device 1030 may include a volatile memory such as a DRAM, a SRAM, a mobile DRAM, a double data rate (DDR) synchronous DRAM (SDRAM), a low power DDR (LPDDR) SDRAM, a graphic DDR (GDDR) SDRAM, or a Rambus DRAM (RDRAM), etc., and a non-volatile memory such as an EEPROM, a flash memory, a PRAM, a RRAM, a MRAM, a FRAM, a NFGM, or a PoRAM, etc.

The user interface 1050 may include at least one input device such as a keypad, a button, a microphone, a touch screen, etc., and/or at least one output device such as a speaker, or a display device, etc. The power supply 1060 may provide power to the mobile system 1000.

Referring to FIG. 13, a mobile system 1000a includes a processor 1010a and a GNSS receiver 100a. The mobile system 1000a may further include a connectivity 1020, a memory device 1030, a user interface 1050 and a power supply 1060.

The mobile system 1000a of FIG. 13 may be substantially the same as the mobile system 1000 of FIG. 12, except that a counter unit 140a and a mode control unit 150a are included in the processor 1010a in FIG. 13 instead of the GNSS receiver 100a.

The counter unit 140a and the mode control unit 150a in FIG. 13 may be substantially the same as the counter unit 140 and the mode control unit 150 in FIG. 1, respectively.

The GNSS receiver 100a may be similar to the GNSS receiver 100 of FIG. 1, and may operate according to the examples described with reference to FIGS. 2 through 11. For example, the GNSS receiver 100a may include a RF unit, a baseband processing unit and a storage unit. The GNSS receiver 100a may selectively operate in the low power mode based on the present operation environment of the GNSS receiver 100a and the control of the mode control unit 150a. When the GNSS receiver 100 enters the low power mode, elements in the GNSS receiver 100 may be selectively and/or sequentially turned off, and the duration of the low power mode may be further controlled, based on a first number that is counted by the counter unit 140a and represents the number of consecutive times the GNSS receiver 100 has entered the low power mode. Accordingly, power consumption of the GNSS receiver 100a and the mobile system 1000a including the GNSS receiver 100a may be efficiently reduced.

In some example embodiments, a power supply unit (for example, the power supply unit 170 in FIG. 1) in the GNSS receiver 100 in FIG. 12 or the GNSS receiver 100a in FIG. 13 may be included in the power supply 1060 in the mobile system 1000 of FIG. 12 or the mobile system 1000a of FIG. 13.

In some example embodiment, the mobile systems 1000 and 1000a may be any mobile system, such as a mobile phone, a smart phone, a tablet computer, a laptop computer, a personal digital assistants (PDA), a portable multimedia player (PMP), a digital camera, a portable game console, a music player, a camcorder, a video player, a navigation system, etc.

In some example embodiment, the mobile system 1000 of FIG. 12 and/or the mobile system 1000a of FIG. 13 may be a wearable device that includes a display device and one of clothing/accessories incorporating computer or advanced electronic technologies, such as a smart watch, smart glasses, a wrist band type device, a wearable computer, a necklace type device, shoes type device, etc. The mobile system may further include an internet of things (IoT) device, an internet of everything (IoE) device, an e-book, etc.

According to example embodiments, the mobile systems 1000 and 1000a and/or components of the mobile systems 1000 and 1000a may be packaged in various forms, such as a package on package (PoP), a ball grid arrays (BGA), a chip scale packages (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multi chip package (MCP), a wafer-level fabricated package (WFP), or a wafer-level processed stack package (WSP).

As will be appreciated by those skilled in the art, inventive concepts may be embodied as a system, method, computer program product, and/or a computer program product embodied in one or more computer readable medium(s) having computer readable program code embodied thereon. The computer readable program code may be provided to a special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

The inventive concepts may be used in any device or system including the GNSS receiver, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive concepts. Accordingly, all such modifications are intended to be included within the scope of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A global navigation satellite system (GNSS) receiver comprising:
    a radio frequency (RF) unit configured to receive a satellite signal from an external satellite;
    a baseband processing unit configured to determine present operation environment of the GNSS receiver based on the satellite signal;
    a storage unit configured to store infatuation received by the RF unit and information generated by the baseband processing unit;
    a mode control unit configured to control an operation mode of the GNSS receiver based on the present operation environment, the operation mode including a normal mode and a low power mode; and
    a counter unit configured to count a first number representing a number of consecutive times in which the GNSS receiver has entered the low power mode,
    wherein when the GNSS receiver enters the low power mode, the mode control unit is configured to turn off at least one of the RF unit, the baseband processing unit and the storage unit based on the first number.

2. The GNSS receiver of claim 1, wherein when the GNSS receiver enters the low power mode, and when the first number is smaller than a first reference number, the mode control unit is configured to turn off the RF unit.

3. The GNSS receiver of claim 2, wherein when the GNSS receiver enters the low power mode, when the first number is equal to or greater than the first reference number, and when the first number is smaller than a second reference number, the mode control unit is configured to turn off the RF unit and the storage unit.

4. The GNSS receiver of claim 3, wherein when the GNSS receiver enters the low power mode, and when the first number is equal to or greater than the second reference number, the mode control unit is configured to turn off the RF unit, the storage unit and the baseband processing unit are turned off.

5. The GNSS receiver of claim 1, wherein when the GNSS receiver enters the low power mode, the mode control unit is configured to control a duration of the low power mode based on the first number.

6. The GNSS receiver of claim 5, wherein the duration of the low power mode increases as the first number increases.

7. The GNSS receiver of claim 1, further comprising:
    a power supply unit;
    a first switch connected between the power supply unit and the RF unit;
    a second switch connected between the power supply unit and the storage unit; and
    a third switch connected between the power supply unit and the baseband processing unit.

8. The GNSS receiver of claim 7, wherein the mode control unit generates a first control signal for controlling the first switch, a second control signal for controlling the second switch, and a third control signal for controlling the third switch.

9. The GNSS receiver of claim 1, wherein the present operation environment includes a number of observable satellites and an intensity of the satellite signal.

10. The GNSS receiver of claim 9, wherein when the number of observable satellites is smaller than a reference number, or when the intensity of the satellite signal is less than a reference intensity, the mode control unit is configured to operate the GNSS receiver in the low power mode.

11. The GNSS receiver of claim 10, wherein at least one of the reference number and the reference intensity is variable.

12. The GNSS receiver of claim 1, further comprising:
    a navigation processing unit configured to perform an initial position acquisition and a position tracking based on the present operation environment.

13. A mobile system comprising:
a processor; and
a global navigation satellite system (GNSS) receiver controlled by the processor,
wherein the GNSS receiver includes:
   a radio frequency (RF) unit configured to receive a satellite signal from an external satellite;
   a baseband processing unit configured to determine present operation environment of the GNSS receiver based on the satellite signal; and
   a storage unit configured to store information received by the RF unit and information generated by the baseband processing unit,
wherein the GNSS receiver is configured to operate in one of a normal mode and a low power mode based on the present operation environment,
wherein when the GNSS receiver enters the low power mode, at least one of the RF unit, the baseband processing unit and the storage unit is turned off based on a first number representing a number of consecutive times in which the GNSS receiver has entered the low power mode.

14. The mobile system of claim 13, wherein the GNSS receiver further includes:
a mode control unit configured to select one of the normal mode and the low power mode based on the present operation environment, and configured to turn off at least one of the RF unit, the baseband processing unit and the storage unit based on the first number when the GNSS receiver enters the low power mode; and
a counter unit configured to count the first number.

15. The mobile system of claim 13, wherein the processor includes:
a mode control unit configured to select one of the normal mode and the low power mode based on the present operation environment, and configured to turn off at least one of the RF unit, the baseband processing unit and the storage unit based on the first number when the GNSS receiver enters the low power mode; and
a counter unit configured to count the first number.

16. A portable electronic device, comprising:
a satellite navigation receiver, the satellite navigation receiver including:
an RF unit;
a baseband unit; and
a storage unit,
wherein the satellite navigation receiver is configured to supply power to or withhold power from the RF, baseband, and storage units, depending upon whether acceptable signals are available from a sufficient number of navigation satellites and based on a first number representing a number of consecutive times in which the satellite navigation receiver has entered a low power mode.

17. The portable electronic device of claim 16, wherein a processor is configured to determine whether acceptable signals are available from a sufficient number of navigation satellites and to initially withhold power from one of the RF, baseband, or storage units if acceptable signals are not available from a sufficient number of navigation satellites.

18. The portable electronic device of claim 17, wherein the processor is configured to withhold power from two of the RF, baseband, or storage units if acceptable signals are not available from a sufficient number of navigation satellites for at least a first threshold period of time.

19. The portable electronic device of claim 18, wherein the processor is configured to withhold power from all three of the RF, baseband, and storage units if acceptable signals are not available from a sufficient number of navigation satellites for at least a second threshold period of time greater than the first threshold period of time.

20. The portable electronic device of claim 16, wherein the satellite navigation receiver is a global navigation satellite system receiver.

* * * * *